United States Patent [19]
Juniman

[11] Patent Number: 5,903,000
[45] Date of Patent: *May 11, 1999

[54] METHOD FOR DETERMINING THE POSITION OF A ROTATING SHAFT

[75] Inventor: Jonathan Juniman, Harleysville, Pa.

[73] Assignee: Honeywell Inc., Minneapolis, Minn.

[ * ] Notice: This patent is subject to a terminal disclaimer.

[21] Appl. No.: 08/828,689

[22] Filed: Mar. 31, 1997

[51] Int. Cl.$^6$ ........................................... G01D 5/34
[52] U.S. Cl. .................. 250/231.13; 250/231.18
[58] Field of Search ..................... 250/231.13, 231.14, 250/231.18, 214 R; 356/373, 375; 341/13

[56] References Cited

U.S. PATENT DOCUMENTS

| | | | |
|---|---|---|---|
| 5,003,171 | 3/1991 | Paley | 250/231.18 |
| 5,773,820 | 6/1998 | Osajda et al. | 250/231.13 |

*Primary Examiner*—Edward P. Westin
*Assistant Examiner*—Kevin Pyo

*Attorney, Agent, or Firm*—Anthony Miologos

[57] ABSTRACT

A method is provided for determining the position of a shaft along a longitudinal axis. The method is used with a device that includes first, second, and third light detecting devices arranged about the shaft in a specific geometric pattern, with the second energy detecting device mounted to the shaft. A light directing device is arranged to deliver light energy sequentially between the first, the second, and the third light detecting devices. The method for determining the position of the shaft comprises the steps of generating a first measured value by measuring the interval the light energy directing device travels between the first and the second light detecting devices. A second measured value is generated that measures the interval the energy directing device travels between the second and the third energy detecting devices. A percentage of shaft rotation is calculated using the first and second measured values. The resultant percentage of shaft rotation is adjusted to compensate for the specific geometric pattern of the light detecting devices.

12 Claims, 5 Drawing Sheets

METHOD FOR DETERMINING THE POSITION OF A ROTATING SHAFT

BACKGROUND OF INVENTION

The present invention relates generally to position determining methods and more particularly to a method for determining the absolute position of a rotating shaft.

It is a common problem to want to know the position of a device whose position is being controlled by an actuator or by some other means. For example, in the controls industry, devices such as valves, each having a valve stem or valve shaft which is rotatable by an actuator, are typically used to control the flow of liquids or various gasses associated with the industrial process. In these applications, it is a common need to know the precise absolute position of the controlled shaft or stem. This information allows for an improved understanding of the process and, subsequently, a more-accurate control of the process by a process control system.

A number of prior solutions are known for measuring or determining this aforementioned position. One method is the use of linear variable differential transformers which can provide accurate positional information. However, they require a mechanical linkage to translate the positional information to a sensor and, additionally, consume a relatively high amount of power in their operation.

Slidewire, potentiometers, or other rotary transducers again require a mechanical link to the controlled device and also have the disadvantage of a sliding electrical contact which can result in long-term unreliability as well as having a potential for producing arcing and/or sparking, precluding the use of these devices in volatile environments.

Hall effect transducers, as they are currently used, generally require a mechanical linkage and are generally susceptible to ambient magnetic fields, electrostatic discharge, and other Electro-Magnetic Interference (EMI).

Additionally, all of the aforementioned devices and methods require the use of extensive electronic circuitry to convert the predominately analog positional information to the digital signals normally required by modern computer-controlled industrial process control systems.

Therefore, it is an object of the present invention to provide a method used to reliably determine the position of a rotatable shaft without the need for mechanical linkages.

It is a further object of the present invention to provide a position determining method that exhibits long-term reliability, is immune to EMI, and is cost effective.

It is a further object of the present invention to provide a position determining method that greatly simplifies interfacing the resultant positional signals to a computer-controlled industrial process control system.

SUMMARY OF THE INVENTION

The method of the present invention is contemplated to be used in a device that includes a shaft rotatably displaceable about a longitudinal axis, a source of light energy, and first, second, and third light detecting devices arranged about the shaft in a specific geometric pattern. The second light detecting device is mounted to the shaft. A light energy directing device is arranged between the plurality of sensors and the source of light energy and is disposed to deliver light energy sequentially between the first, the second, and the third light detecting devices. The device further includes a position determining circuit having a memory device and a controller that can call up a detection and counting routine.

The method of the present invention determines the position of the shaft along a longitudinal axis by first calling up and running the detection and counting routine. This routine detects and measures the interval at which light energy is detected by the light detection devices. The detection routine includes the steps of starting a first counting sequence when the light energy is detected by the first light detecting device, ending the first counting sequence and storing a first count value $T_1$ in the memory device, and subsequently starting a second counting sequence, when light energy is detected by the second light detecting device. The second counting sequence is ended and a second count value $T_2$ is produced when the light energy is detected by the third light detecting device.

The controller then calls up a position determining routine that includes the steps of reading the first count value $T_1$ from the memory device and the second count value $T_2$. The controller then uses $T_1$ and $T_2$ to calculate a percentage of shaft rotation "P". The percentage of shaft rotation P is then adjusted to compensate for the specific geometric pattern of the light detecting devices. The resultant value of the adjusting step is stored in the memory device as the representation of the absolute position of the shaft.

Thus, there is provided a method for determining the position of a rotatable shaft, which offers long-term reliability, is immune to EMI, and is cost effective in its operation.

The present invention further benefits from the absence of the need to have sensed analog positional information translated into digital information, which is typically required by modern computer-controlled industrial process control systems.

BRIEF DESCRIPTION OF THE DRAWINGS

A better understanding of the invention may be had by reading the following detailed description in conjunction with the drawings in which.

DETAILED DESCRIPTION OF THE INVENTION

Figure 1:
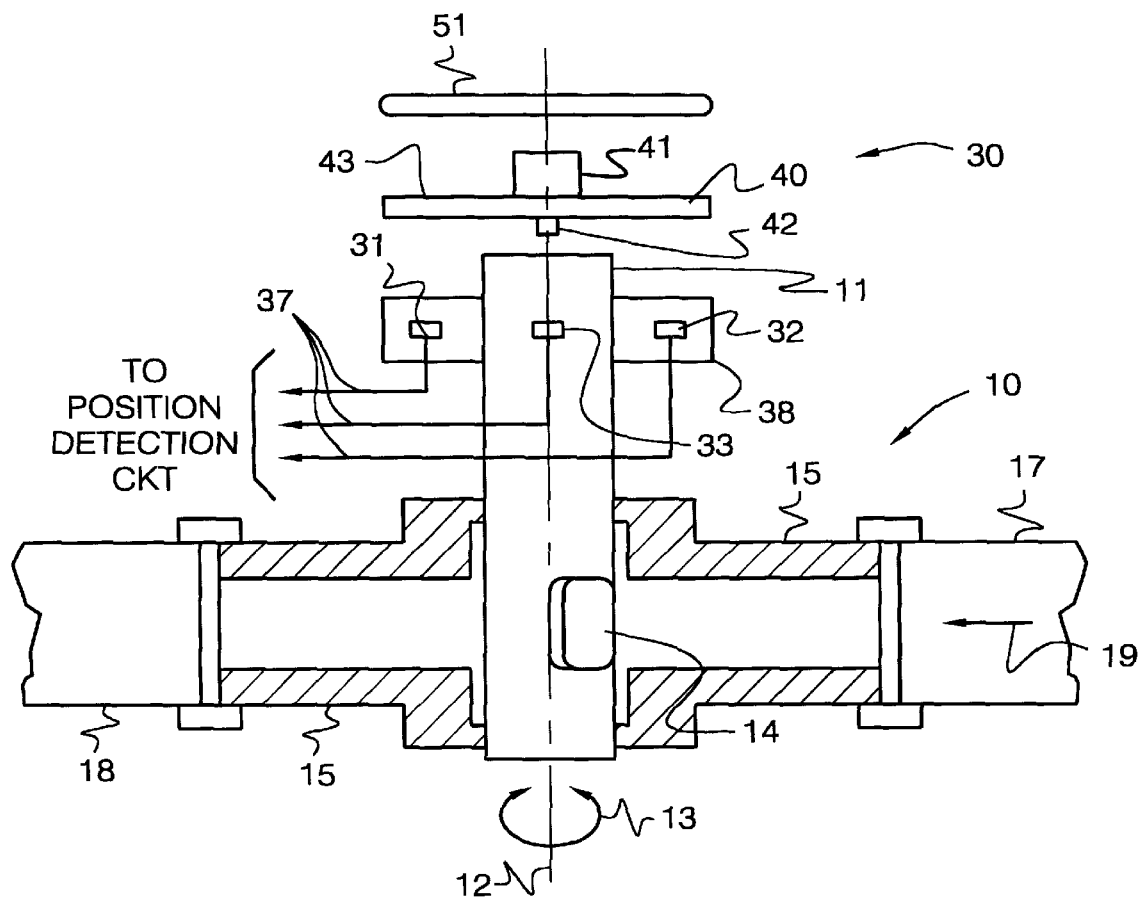
FIG. 1 shows a position detection apparatus used in conjunction with the present invention.

A typical valve 10, where the present invention is used to advantage, is shown in FIG. 1. Valve 10 is comprised of a valve body 15, suitably connected on one end to a conduit 17 and on an opposite end to a conduit 18. A valve shaft 11 extends through valve body 15 and includes an opening or orifice 14 extending through the shaft. The valve shaft 11 is disposed to be rotatably displaceable along a longitudinal axis shown as 12, in the directions shown as 13. Typically, the valve shaft 11 controls the flow of a controlled medium such as a liquid, or a gas, from one side of the valve body 15 and conduit 17 to the opposite side of the valve body 15 and conduit 18.

The method in which valve shaft 11 controls the flow of a controlled medium will now be explained. This explanation will be made with the flow of the controlled medium moving in the direction shown by arrow 19, or from conduit 17 to conduit 18. As will be understood by those skilled in the art, the controlled medium can also flow in the opposite direction, from conduit 18 to conduit 17. Valve shaft 11 will operate in the same manner with flow in either direction and is not limited thereto. The flow is controlled by rotating valve shaft 11 in either direction 13. When valve 10 is in a closed position, a solid surface of valve shaft 11 is presented to the normal direction of medium flow. Rotational displacement of the valve shaft 11 will progressively move the solid surface away from the medium allowing opening 14 to proportionally open from a partially-open position to a fully-open position.

It will be understood by those skilled in the art that when the solid surface of valve shaft 11 is presented to the controlled medium, the flow of the medium is effectively stopped from flowing through valve shaft 11 to conduit 18. Rotational displacement of the valve shaft 11 thereby presenting opening 14 to the medium, allows the medium to flow through the valve shaft 11 and to conduit 18. The amount of flow across the valve shaft 11 is controlled by the amount of opening 14 that is presented to the medium. A small presentation allows only a small amount of flow to occur, while the full presentation of opening 14 would allow a maximum amount of the controlled medium to flow. Therefore, the amount of flow between conduit 17 and conduit 18 is directly proportional to the rotational displacement of valve shaft 11. Valve shaft 11 can be either manually rotated by hand, or connected to an actuating device (not shown) which can rotatably displace valve shaft 11 responsive to positioning signals from a process control system.

It is desirable within the environment of a process control system to know at any given time the precise position of the valve shaft 11. Additionally, it is also desirable to be able to monitor the rotational displacement of valve shaft 11 as an actuator moves or displaces the valve shaft 11, for example, as when the flow of the controlled medium is required to be increased or decreased under control of the process control system. Further, many valve actuating devices require the precise position of the valve shaft be known as it is displaced. This position is normally communicated to the valve actuating device via a feedback signal. This feedback signal is used to gauge the progress of the valve shaft rotation in order to either increase or decrease rotation. This minimizes the over or under displacement of the shaft, or as it is more commonly known in the industry, the overshoot or undershoot, respectively.

The valve 10 just explained and shown by FIG. 1 is an example of the environment where the present invention can be used to advantage It will be appreciated by those skilled in the art that the present invention can also be effectively used in other industrial control functions, such as to control furnace dampers and is not limited thereto.

Figure 2:
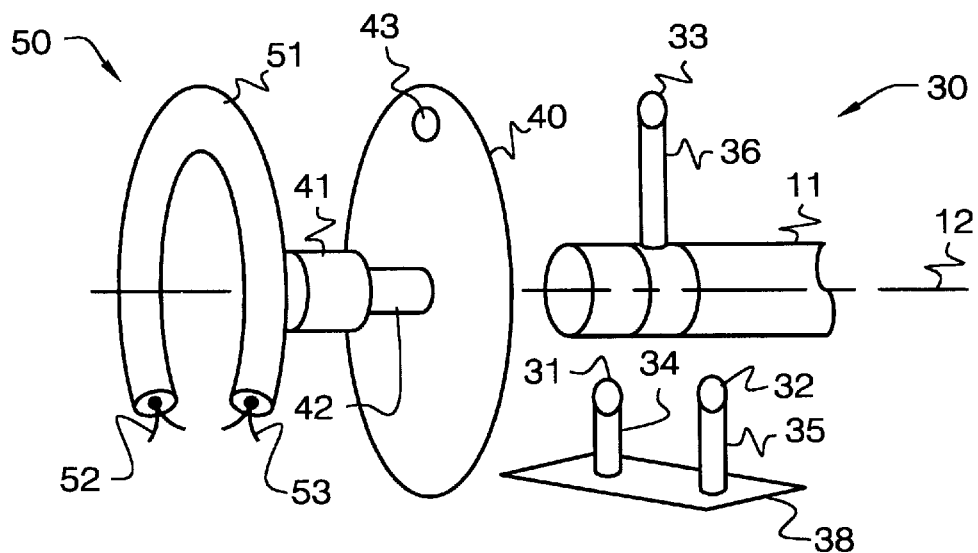
FIG. 2 shows a position detection apparatus used in conjunction with present invention in an isometric view.

With continued reference to FIG. 1, and also with reference to FIG. 2, an apparatus is shown that is used to collect the data required by the method of the present invention. The apparatus 30 includes stationary light detecting devices 31 and 32 mounted on respective stems 34 and 35. Stems 34 and 35 are fixedly mounted on a stationary platform 38. A rotatable light detecting device 33 is mounted to stem 36, which is in turn mounted to valve shaft 11. As can be seen and understood, any rotatable displacement of valve shaft 11 will also displace light detecting device 33. Additionally, light detecting devices 31, 32, and 33 lie within the center line of a radial axis. Light detecting devices 31, 32, and 33 are any type of the currently-known devices, such as phototransistors, optical detectors, infrared detectors, and the like. These devices typically provide an output signal when light rays of a particular wavelength or spectrum are detected. The selection of the type of light detecting device used is dependent on the light source used, i.e., Light Emitting Diode (LED), infrared, or incandescent light and for purposes of this invention may be light detecting devices that detect light from any of the above-mentioned sources. Each of the light detecting devices 31, 32, and 33 further includes a signal lead 37, which is connected to the position detection circuit of the present invention.

A light directing disc 40 is rotatably mounted in front of valve shaft 11 and light detecting devices 31, 32, and 33. Light directing disc 40 is constructed of an opaque material and is mounted to a small electric motor 41 via the electric motor's shaft 42. The longitudinal axis of electric motor shaft 42 and the concentric center of disc 40 are aligned along the longitudinal axis 12 of valve shaft 11. Disc 40 further includes an opening 43, which traverses through disc 40. Opening 43 is located on disc 40 adjacent the perimeter edge of disc 40 in a position where, as the disc 40 is rotated, opening 43 will individually align at different points during the rotation of disc 40 with each of the light detecting devices 31, 32, and 33.

The apparatus of the present invention further includes a light source 50, which in this embodiment is shown to be annular. Light source 50 is comprised of a transparent plastic light guide 51 having LEDs 52 and 53 mounted thereon. Light guide 51 allows the light emitted by LEDs 52 and 53 to be refractively coupled into the guide and to be transmitted from the guide due to its transparency. Its annular form also aligns along the aforementioned radial axis center line. It should be understood that the annular form of light source 50 is only shown as an example to help understand the concepts of the present invention. It will be well understood by those skilled in the art that other forms or types of light sources can be substituted for the form and type of light source shown and the present invention is not limited thereto.

Figure 3:
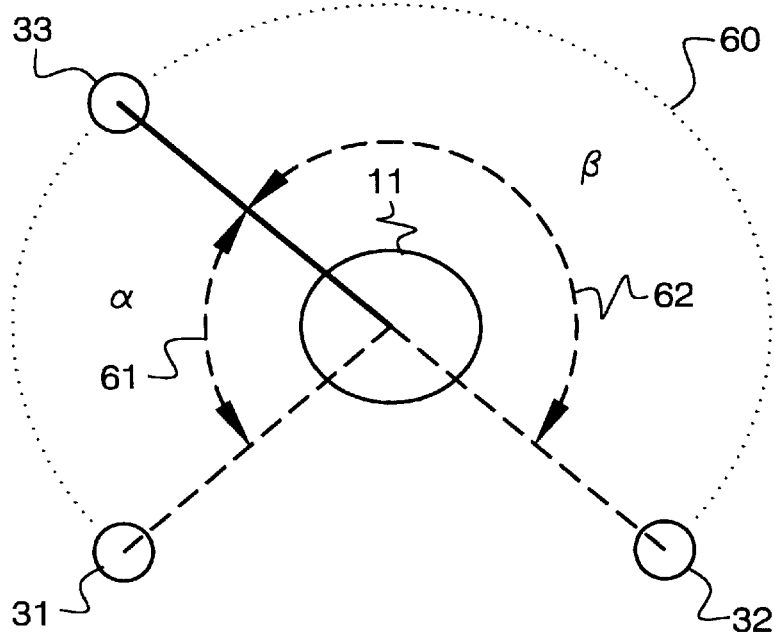
FIG. 3 shows a diagram of the geometric relationships among the light detecting devices of the present invention.

Turning now to FIG. 3, a detailed explanation of the geometric relationships involved in the operation of the aforementioned apparatus will be discussed. As can be seen, FIG. 3 diagramatically shows the relationship of the light detecting devices to each other, as would be seen by opening 43 of disc 40. Light detecting devices 31, 32, and 33 all lie within the aforementioned radial axis center line shown as 60. As was previously explained, light detecting devices 31 and 32 are fixedly mounted to the apparatus 30. Light detecting device 33 is mounted to valve shaft 11 and is arranged to traverse along the radial axis center line 60. A rotation of valve shaft 11 along its longitudinal axis 12 would be translated by travel of light detecting device 33 along axis 60 between light detecting devices 31 and 32. Therefore, the location or position of valve shaft 11, at any one time, can be calculated by measuring the rotational angle between light detecting devices 31 and 33, providing a first angle 61 ($\alpha$) and the rotational angle between light detecting devices 33 and 32, providing the second angle 62 ($\beta$). Since light detecting devices 31 and 32 are fixed, the total range of rotation can be expressed as:

$$R = \alpha + \beta$$

where "R" is the total range of rotation, "$\alpha$" is the rotation in degrees between light detecting devices 31 and 33, and "$\beta$" is the rotation in degrees between light detecting devices 33 and 32. Thus, "R" represents the physical geometry of the apparatus. As will be understood by those skilled in the art, the physical geometry of the apparatus of the present invention is arbitrary, with a constraint that "R" is less than 360 degrees.

The method of the present invention contemplates the use of time to measure the degree rotations 61 and 62. This can be accomplished by measuring the time that opening 43 travels in one direction sequentially between light detecting devices 31, 33, and 32. A ratiometric association of time to degrees of rotation can thus be expressed as:

$$T_1/(T_1+T_2)=\alpha/\alpha+\beta$$

where, $T_1$ is the time that opening 43 travels between light detecting devices 31 and 33 and $T_2$ is the time that opening 43 travels between light detecting devices 33 and 32.

Therefore, the absolute position of the shaft can be determined by a position determining calculation solving where along the radial center line 60 and between light detecting devices 31 and 32, light detecting device 33 is located. The position of light detecting device 33 can be expressed as a percentage of shaft travel or "P" since it is physically mounted to shaft 11. Therefore, the following position determining algorithm or formula can be used to find the position of light detecting device 33 within the total range of rotation of the apparatus:

$$P=T_1/(T_1+T_2)$$

$$\alpha=PR$$

$$\beta=R-a=(1-P)R$$

It can be appreciated from the above defined position determining algorithm that the absolute position of shaft 11 can thus be ascertained by taking a time measurement between light detecting device 31 and 33 ($T_1$) and light detecting device 33 and 32 ($T_2$) and including the time measurements $T_1$ and $T_2$ thus obtained, into the constants of the known physical geometry of the apparatus.

Figure 4:
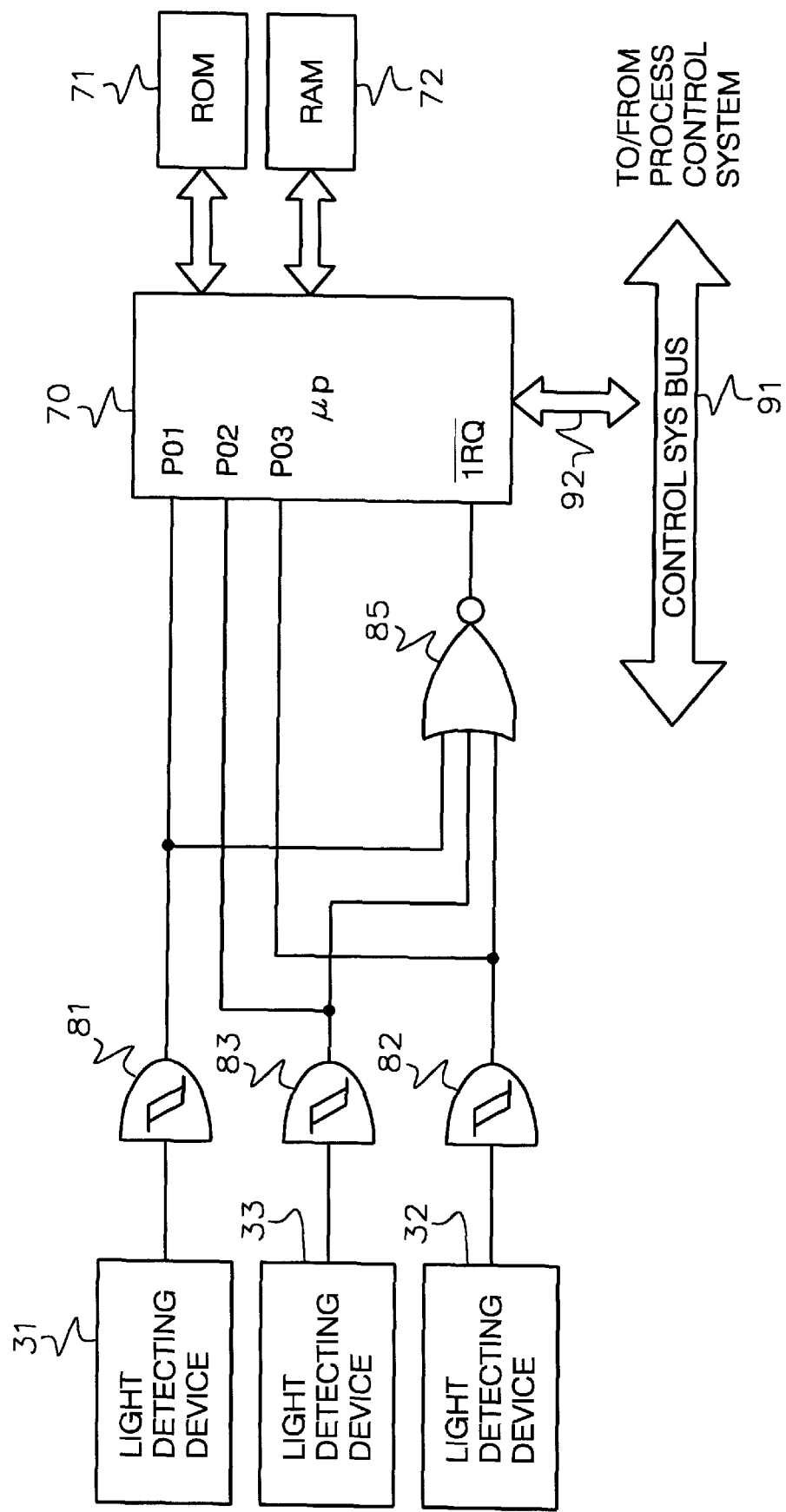
FIG. 4 shows a position determining circuit used to practice the method of the present invention.

Turning now to FIG. 4, a position determining circuit is shown used by the method of the present invention. The position determining circuit shown includes trailing edge detection devices 81, 82, and 83 each having their respective inputs connected to the output of a respective light detecting devices 31, 32, and 33. Devices 81, 82, and 83 are shown in this embodiment as schmitt trigger devices but any known device that produces a signal on the transition of a negative-to-positive or positive-to-negative-going signal can be used. Each of the trailing edge detection devices 81, 82, and 83 has its respective output connected to NOR gate 85. As can be seen, an output signal from any of the devices 81, 82, and 83 will result in an output signal from NOR gate 85. The output of NOR gate 85 is connected to the Interrupt Request ($\overline{IRQ}$) input of a microprocessor 70. The output of each of the devices 81, 82, and 83 is further connected to respective I/O ports PO1, PO2, and PO3 of device 70. A Read Only Memory (ROM) 71 is associated with microprocessor 70 and is used to store the ratiometric calculating algorithm of the present invention and the operating program or processing instructions used by the microprocessor 70. A Random Access Memory (RAM) 72 is also associated with microprocessor 70 and is used as a memory store for the $T_1$ and $T_2$ counts and the digital representation of the position of the valve shaft 11.

It is contemplated that the present invention will be used with a process control system (not shown) that includes a Control System BUS 91 that is connected to microprocessor 70 via communications BUS 92. The process control system will from time to time poll microprocessor 70, requesting the transmission to the process control system of the stored digital data representing the position of the valve shaft 11. However, it will be understood by those skilled in the art that microprocessor 70 could also be connected to the local controller of a valve actuating system, thereby providing feedback signal representing the valve's position as the valve shaft is rotated to a desired position. Further, ROM 71 and RAM 72 could also be integral and an internal component of microprocessor 70 as is commonly found in the class of devices called microcontrollers. ROM 71 and RAM 72 are shown here external to device 70 to better explain the way in which the invention is used to advantage.

Figure 5:
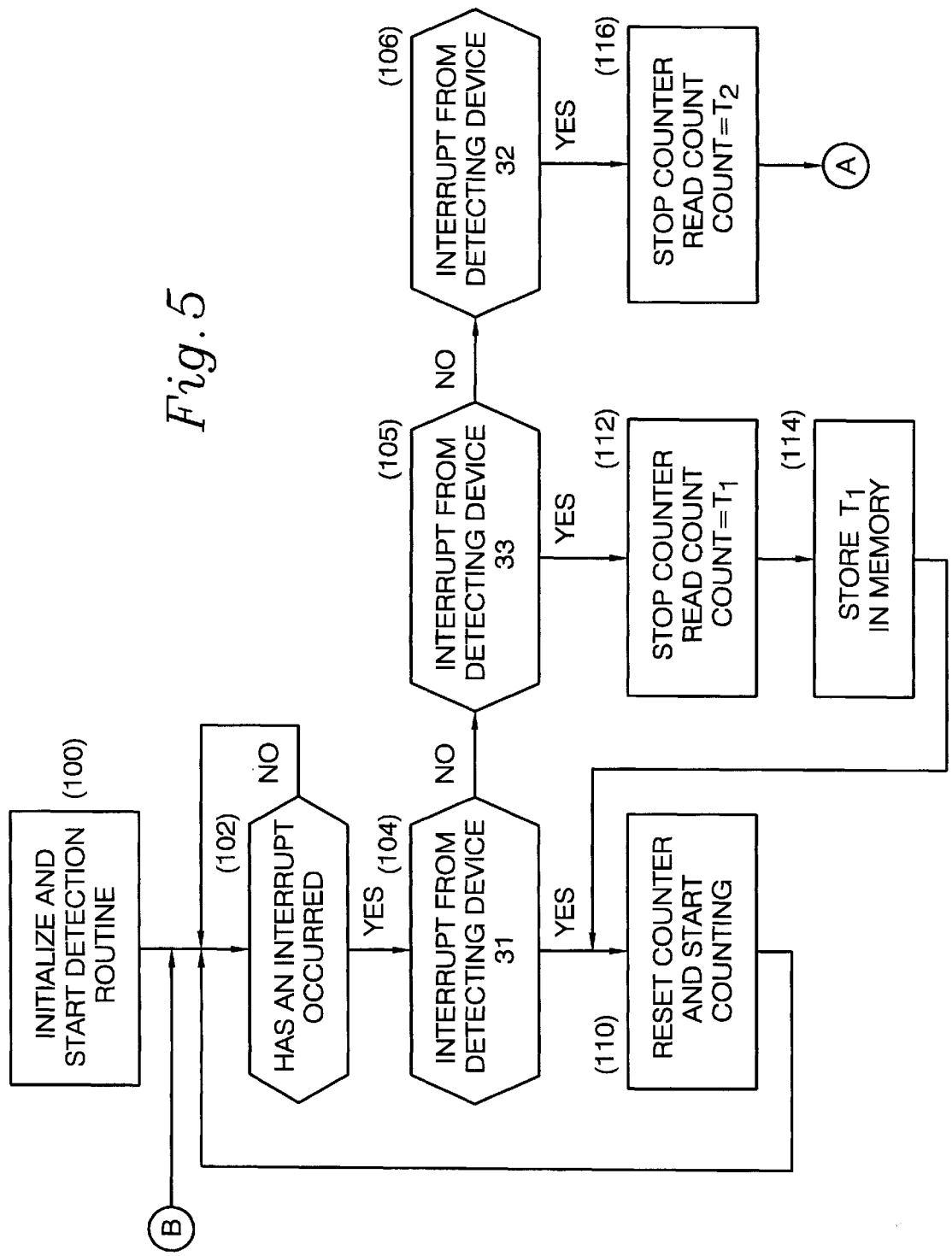
FIG. 5 shows a block diagram of the position detection routine of the method of the present invention.
Figure 5A:
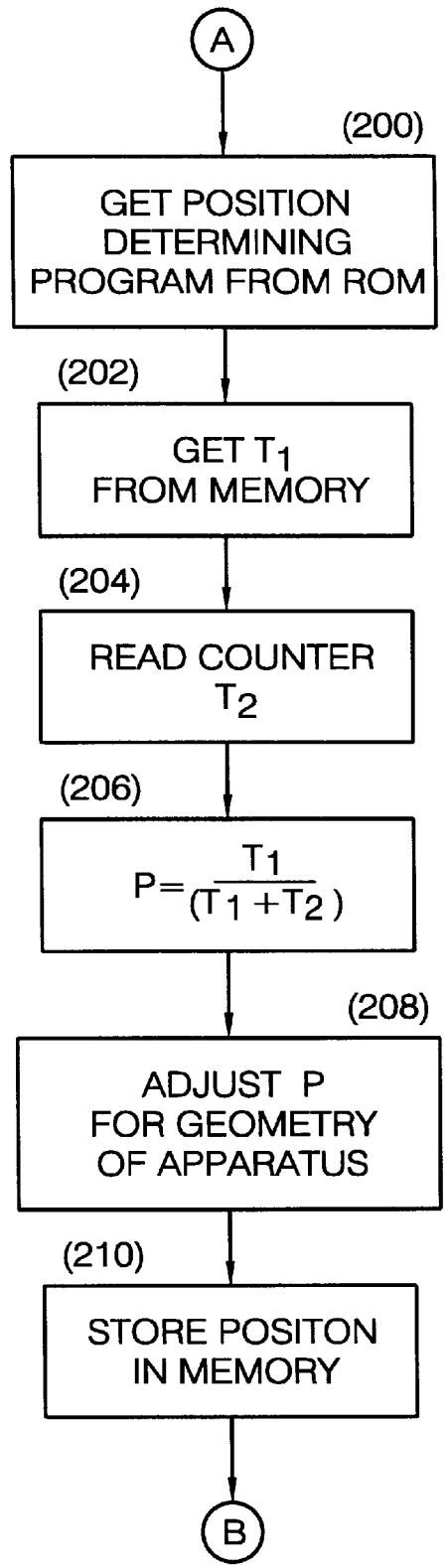
FIG. 5A shows a block diagram of the position determining routine of the method of the present invention.

With reference to FIG. 5, FIG. 5A, and FIG. 4 an explanation of the method of the operation of the present invention will now be made. As was previously explained, the present invention is used to determine a time measurement, or the time that the opening 43 travels in a clockwise direction among light detecting devices 31, 33, and 32 as the means for measuring the degree of rotation 61 and 62.

A position detecting routine shown in a block diagram in FIG. 5 is used by microprocessor 70 to detect, time, and capture the aforementioned time measurements. The routine can be in the form of a software program stored in ROM 71 and loaded into the microprocessor 70. Initially the routine initializes the microprocessor 70 (block 100) and polls the I$\overline{RQ}$ input of microprocessor 70 to determine if an interrupt has occurred (block 102).

As disc 40 rotates, for purposes of this embodiment in a clockwise direction, it will encounter light detecting device 31 first. When the light beam emanating from opening 43 strikes light detecting device 31, light detecting device 31 turns on, causing trailing edge detection device 81 to send its output signal to NOR gate 85 and the $\overline{IRQ}$ input of microprocessor 70. Upon detection of the interrupt, microprocessor 70 then polls its I/O ports to determine which one of light detecting devices 31, 32, and 33 is causing the interrupt (block 104, 106, 108). Trailing edge detecting device 81 also sends its output signal to port PO1 of the microprocessor 70. Microprocessor 70, upon detection of this first detection device signal on PO1, will reset and start a counting routine (block 110). While the counting routine is running, the microprocessor 70 will also enter and wait for the next interrupt (block 102). As disc 40 further rotates, the light emanating from opening 43 is masked from light detecting device 31, turning off the first detection signal. The counter, however, continues counting.

When the light emanating from opening 43 next strikes light detecting device 33, light detecting device 33 turns on, causing trailing edge detection device 83 to send its output signal to NOR gate 85 and to port PO2. Upon detection of the $\overline{IRQ}$ signal, microprocessor 70 then polls its I/O ports (blocks 104, 105, 106) for the source of the input signal. Microprocessor 70, upon detection of this second detection signal on PO2, will halt the counter and read the count (block 112). This first count, designated as $T_1$, is stored in RAM 72 (block 114). The counter is then reset and the counter routine restarted (block 110). Again as was done earlier, while the counting routine is running, the microprocessor 70 will also enter and wait for the next interrupt $\overline{IRQ}$ signal to occur (block 102). As disc 40 further rotates, the light emanating from opening 43 is masked from light detecting device 33, turning off the second detection signal.

When the light beam from opening 43 finally strikes light detecting device 32, light detecting device 32 turns on, causing trigger device 82 to send its output signal to NOR gate 85 and port PO3 of microprocessor 70. Upon detection of the interrupt signal (block 102), the microprocessor again polls to ascertain which device has caused the interrupt (blocks 104, 105, and 106). On detection of this third detection signal on port PO3 (block 106), the counter will be halted and the count held (block 116). The value in the counter routine for this count is used for variable $T_2$ of the ratiometric algorithm explained earlier. Microprocessor 70 then loads the position determining routine (block 200) shown in FIG. 5A. The position determining routine retrieves the $T_1$ value stored previously in RAM 72 (block 202) and reads count $T_2$ from the counter (block 204). Next "P", or the percentage of shaft travel, is calculated using the count variables $T_1$ and $T_2$ (block 206). "P" is then adjusted for the geometry of the apparatus using:

$$\alpha = PR$$
$$\beta = R - a = (1-P)R$$

where "R" is the total range of rotation, "α" is the rotation in degrees between light detection devices 31 and 33, and "β" is the rotation in degrees between light detecting devices 33 and 32 (block 208). The result of the above identified calculations is stored in RAM 72 as the representation of the rotational position of shaft 11 (block 210).

Under control of an operating routine the apparatus can measure, calculate, and update shaft travel on a periodic basis replacing the old data with new data. Alternatively, the position of the shaft 11 can be determined on a demand basis or when requested by a process control system. When the process control system issues a request for the latest value of shaft travel, the data is transferred via communication BUS 92 to control system BUS 91 and to a central controller of the process control system. The process control system can then translate the value received into an absolute position of the valve shaft position for display to a human operator or used as process variable in a process controlling routine. It will be appreciated by those skilled in the art that the value of shaft travel measured and calculated by the present invention can also be output to the controller of a valve shaft actuating device where it is used as a feedback signal indicating the present position of the shaft as it is being rotated by the actuator.

The present invention has been described with particular reference to the preferred embodiments thereof. It will be obvious that various changes and modifications may be made therein without departing from the spirit and scope of the invention as defined in the appended claims.

What is claimed is:

1. In a device including a shaft rotatably displaceable about a longitudinal axis, first, second, and third energy detecting devices arranged about the shaft in a specific geometric pattern and having said second energy detecting device mounted to said shaft, an energy directing device arranged to deliver energy sequentially between said first, said second, and said third energy detecting devices, a method for determining the position of said shaft along said longitudinal axis, comprising the steps of:

generating a first measured value by measuring the interval said energy directing device travels between said first and said second energy detecting devices;

generating a second measured value measuring the interval said energy directing device travels between said second and said third energy detecting devices;

calculating a percentage of shaft rotation with said first and said second measured values; and adjusting said percentage of shaft rotation to compensate for the specific geometric pattern of said first, said second, and said third detecting devices.

2. The method of claim 1, wherein said first, said second, and said third energy detecting devices detect for the presence of light in a specific wavelength and said energy directing device emits light energy of a specific wavelength wherein the step of generating a first measured value measures a time interval between detection of said light in said specific wavelength by said first energy detecting device and subsequently said second energy detecting device thereby producing a first count $T_1$.

3. The method of claim 2, wherein the step of generating a second measured value measures the time interval between detection of said light energy in a specific wavelength by said second energy detecting device and subsequently said third energy detecting thereby producing a second count $T_2$.

4. The method of claim 3, wherein the step of calculating the percentage of shaft rotation is in accordance with $$P = T_1/(T_1 + T_2)$$

where

P=the percentage of shaft rotation.

5. The method of claim 4, wherein the step of adjusting said percentage of shaft rotation to compensate for the specific geometric pattern of said first, said second, and said third detecting devices is in accordance with $$\alpha = PR$$
$$\beta = R - a = (1-P)R$$

where

R=the total rotation in degrees between said first detecting device and said third detecting device.

6. In a device including a shaft rotatably displaceable about a longitudinal axis, a source of light energy, first, second, and third light detecting devices arranged about the shaft in a specific geometric pattern and having said second light detecting device mounted to said shaft, a light energy directing device arranged between the plurality of sensors and the source of light energy arranged to deliver light energy sequentially between said first, said second, and said third light detecting devices, and a position determining circuit having at least a means for counting and a memory store, the method for determining the position of the shaft along said longitudinal axis including the steps of:

starting a first counting sequence when said light energy is detected by said first light detecting device;

ending said first counting sequence and storing a first count value $T_1$ in said memory store, and subsequently starting a second counting sequence when said light energy is detected by said second light detecting device;

ending said second counting sequence and producing a second count value $T_2$ when said light energy is detected by said third light detecting device;

reading said first count value $T_1$ from said memory store and said second count value $T_2$ and calculating a percentage of shaft rotation P; and adjusting said percentage of shaft rotation P to compensate for said specific geometric pattern of the device.

7. The method of claim 6, wherein the step of calculating the percentage of shaft rotation P is in accordance with $$P = T_1/(T_1 + T_2).$$

8. The method of claim 7, wherein the step of adjusting said percentage of shaft rotation is in accordance with $$\alpha = PR$$

$$\beta = R - a = (1-P)R$$

where

R = the total rotation in degrees between said first light detecting device and said third light detecting device.

9. The method of claim 8, wherein the result of the step of adjusting said percentage of shaft rotation is stored in said memory store.

10. In a device including a shaft rotatably displaceable about a longitudinal axis, a source of light energy, first, second, and third light detecting devices arranged about the shaft in a specific geometric pattern and having said second light detecting device mounted to said shaft, a light energy directing device arranged between the plurality of sensors and the source of light energy arranged to deliver light energy sequentially between said first, said second, and said third light detecting devices, and a position determining circuit having at least a controller and a memory store, the method for determining the position of the shaft along said longitudinal axis including the steps of:

a) fetching and initializing a detection routine by said controller from said memory store allowing said controller to monitor said device wherein said detection routine comprises the steps of:

i) detecting for a first interrupt indicating detection of light energy by said first light detecting device;

ii) resetting a counting routine responsive to said first interrupt and starting a first counting sequence;

iii) detecting for a second interrupt indicating detection of light energy by said second light detecting device;

iv) terminating said first counting sequence and reading and storing in said memory store a first count value $T_1$;

v) resetting said counting routine and starting a second counting sequence;

vi) detecting for a third interrupt indicating detection of light energy by said third light detecting device; and vii) terminating said second counting sequence generating a second count value $T_2$;

b) fetching a position determining routine by said controller from said memory store arranged to allow said controller to determine the position of said shaft along said longitudinal axis, said position determining routine comprising the steps of:

i) retrieving the count value $T_1$ from said memory store;

ii) reading said second count value $T_2$;

iii) calculating a percentage of shaft rotation P;

iv) adjusting said percentage of shaft rotation P to compensate for said specific geometric pattern; and v) storing the result of adjusting said percentage of shaft rotation P in said memory store.

11. The method of claim 10, wherein the step of calculating the percentage of shaft rotation P is in accordance with $$P = T_1/(T_1+T_2).$$

12. The method of claim 10, wherein the step of adjusting said percentage of shaft rotation is in accordance with $$\alpha = PR$$

$$\beta = R - a = (1-P)R$$

where

R = the total rotation in degrees between said first light detecting device and said third light detecting device.

* * * * *